Figure 1:
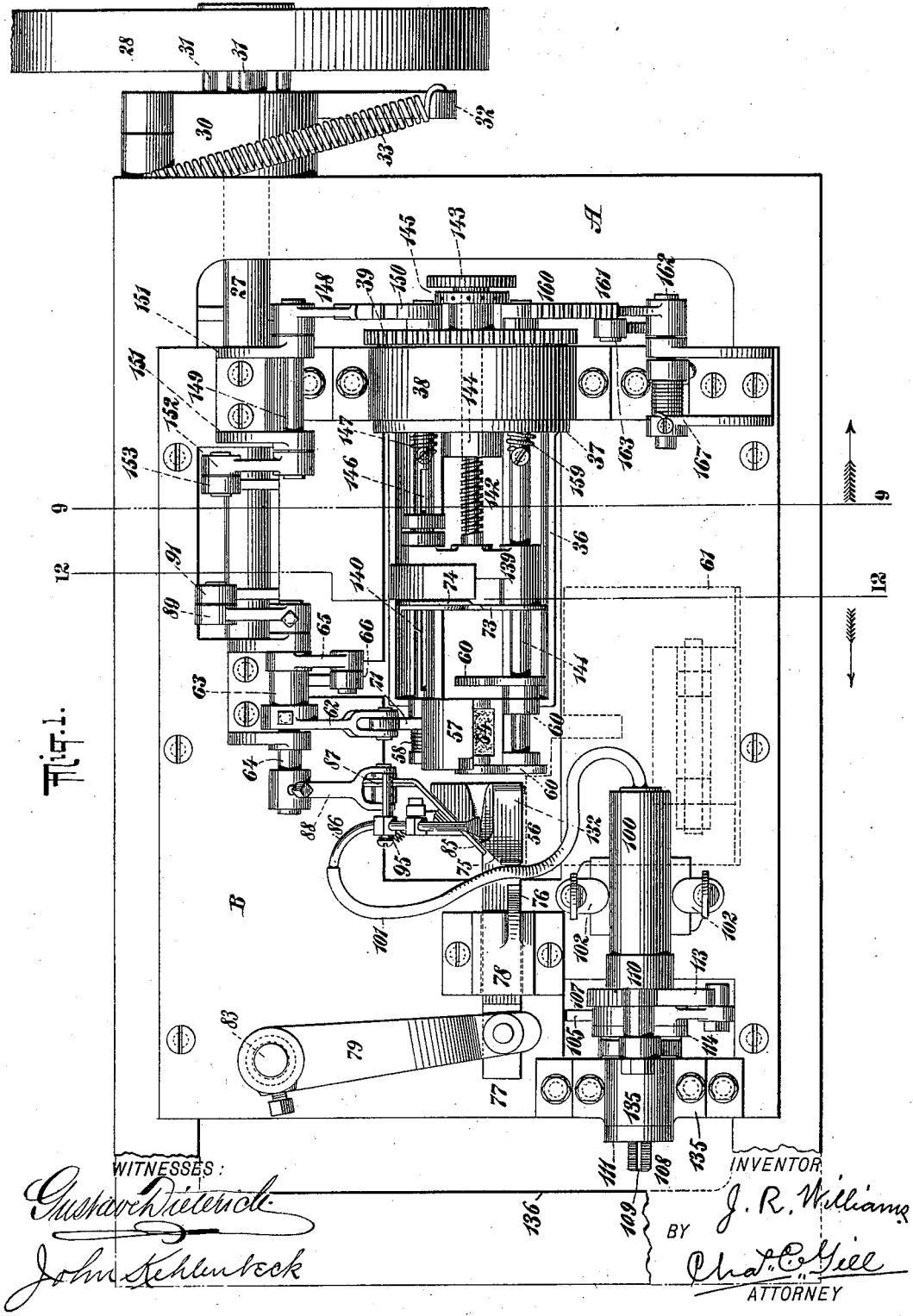

(No Model.) 10 Sheets—Sheet 1.

J. R. WILLIAMS.
CIGAR MAKING MACHINE.

No. 595,799. Patented Dec. 21, 1897.

WITNESSES: Gustave Dieterich, John Kehlenbeck

INVENTOR: J. R. Williams
BY Chas. C. Gill
ATTORNEY

THE NORRIS PETERS CO., PHOTO-LITHO., WASHINGTON, D. C.

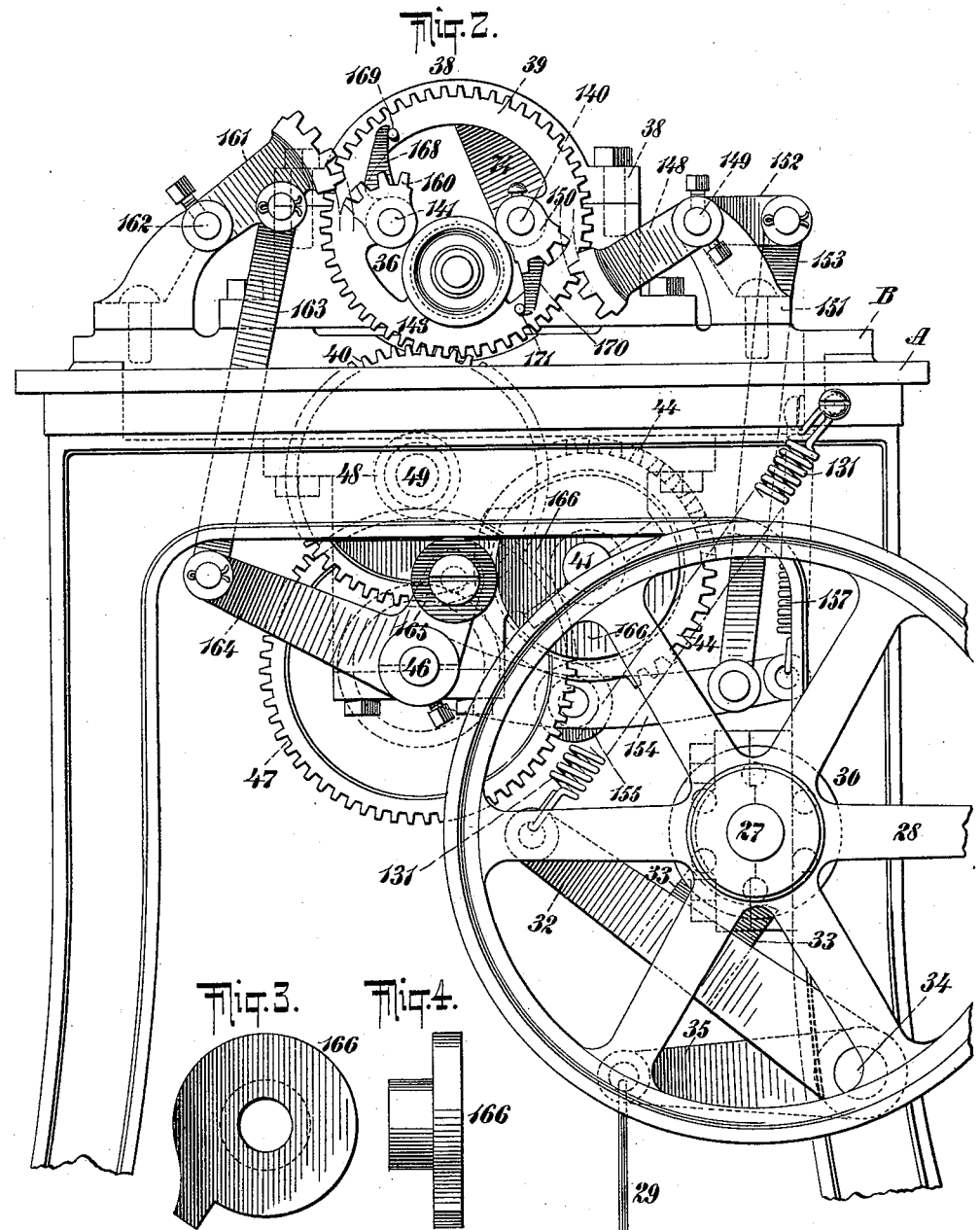

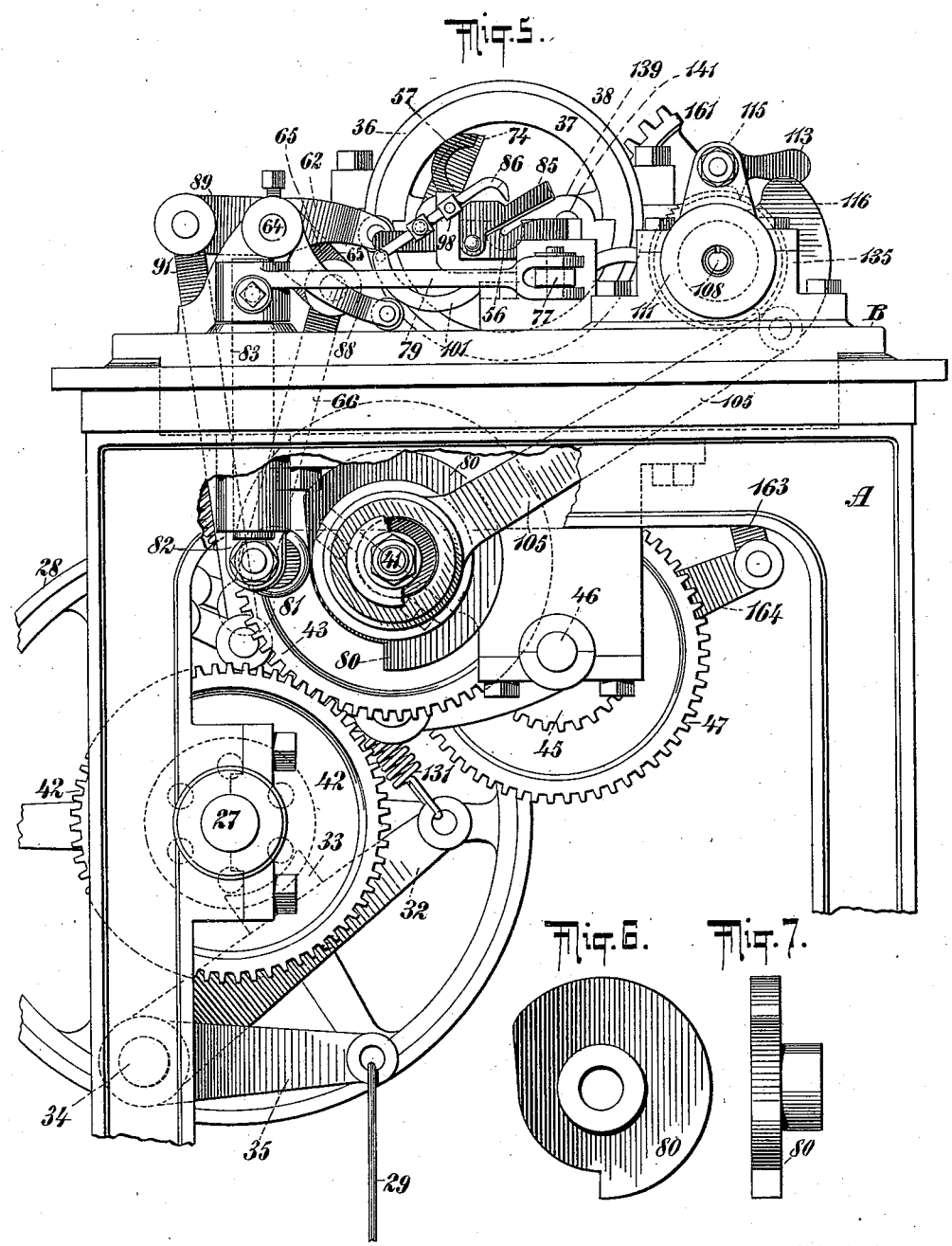

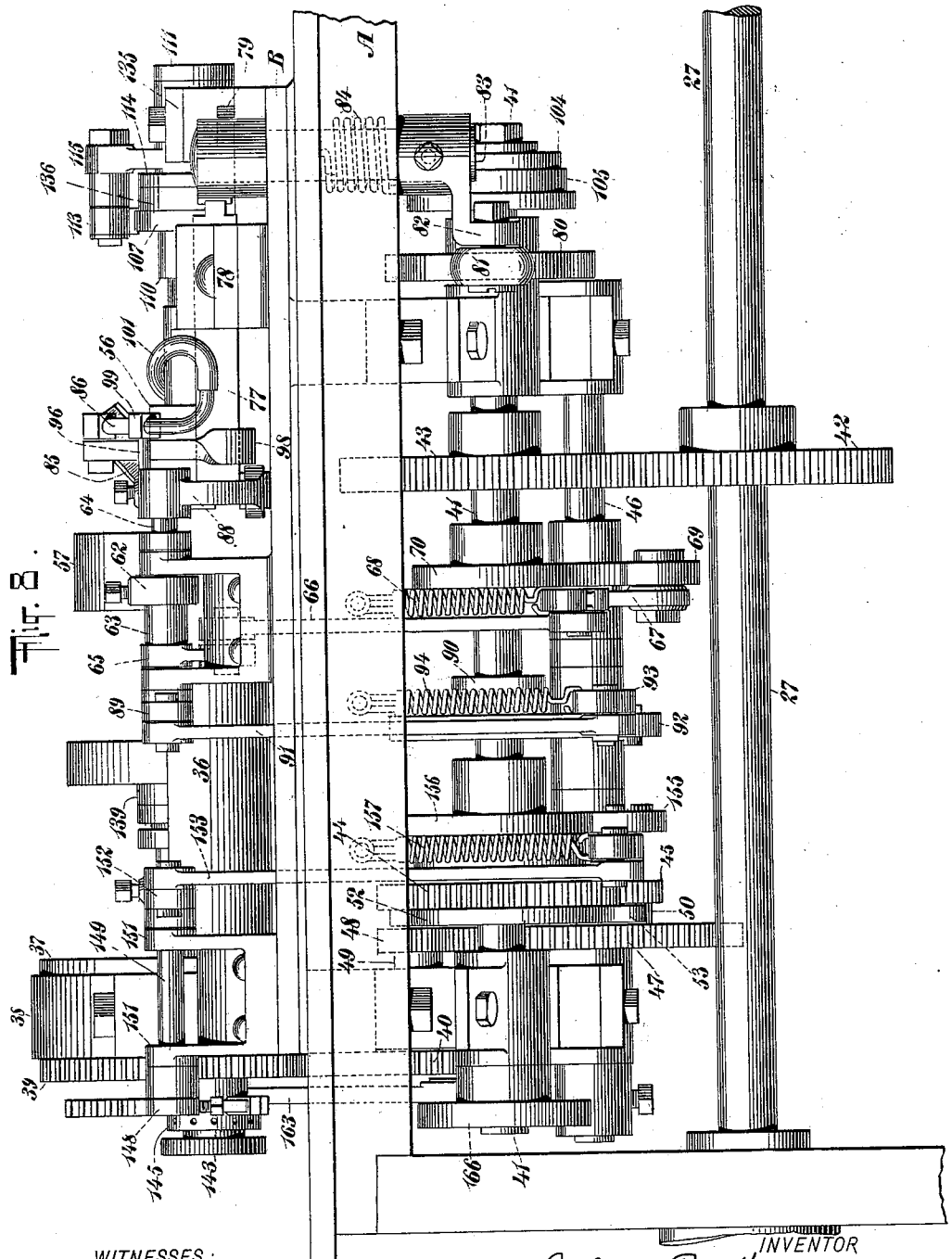

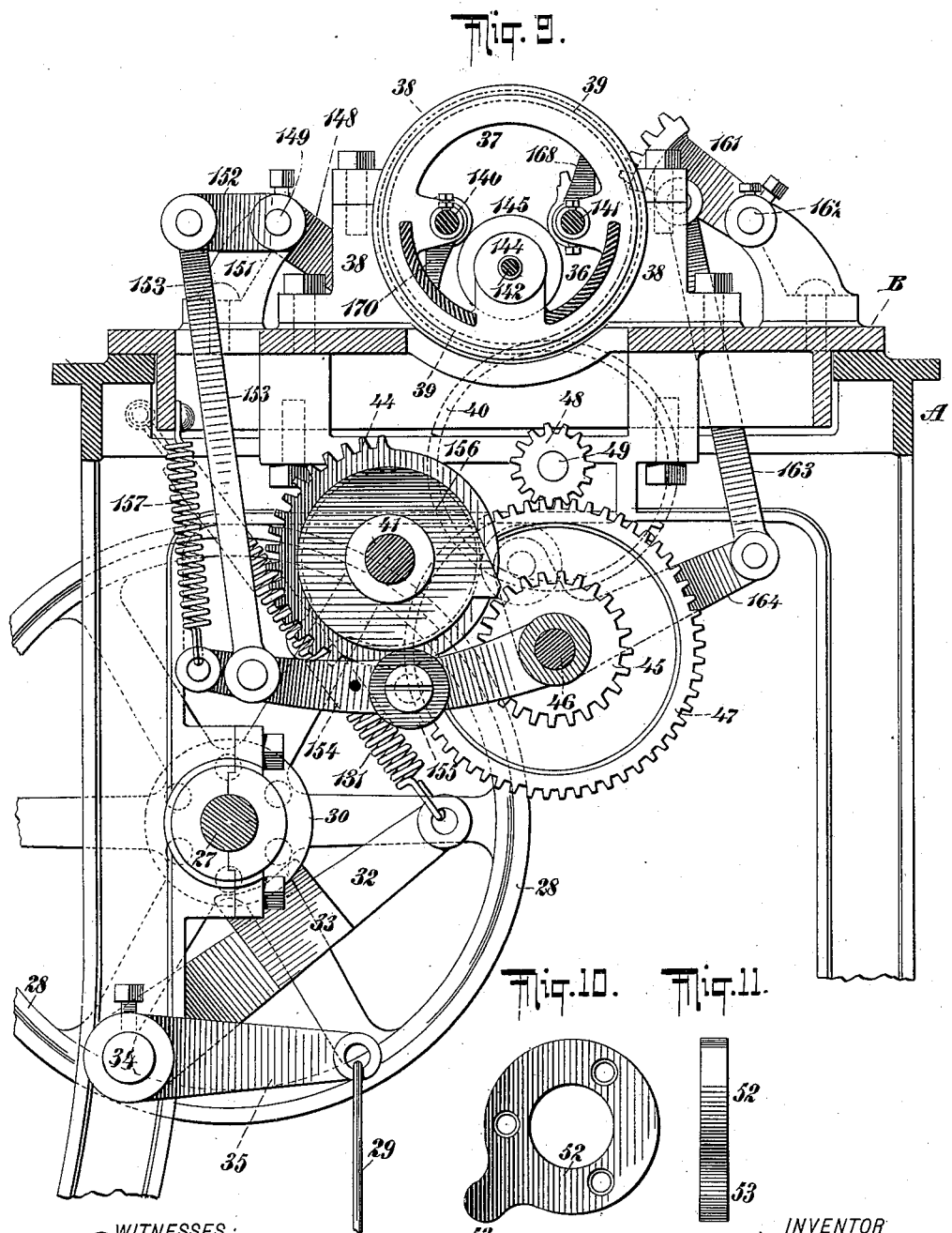

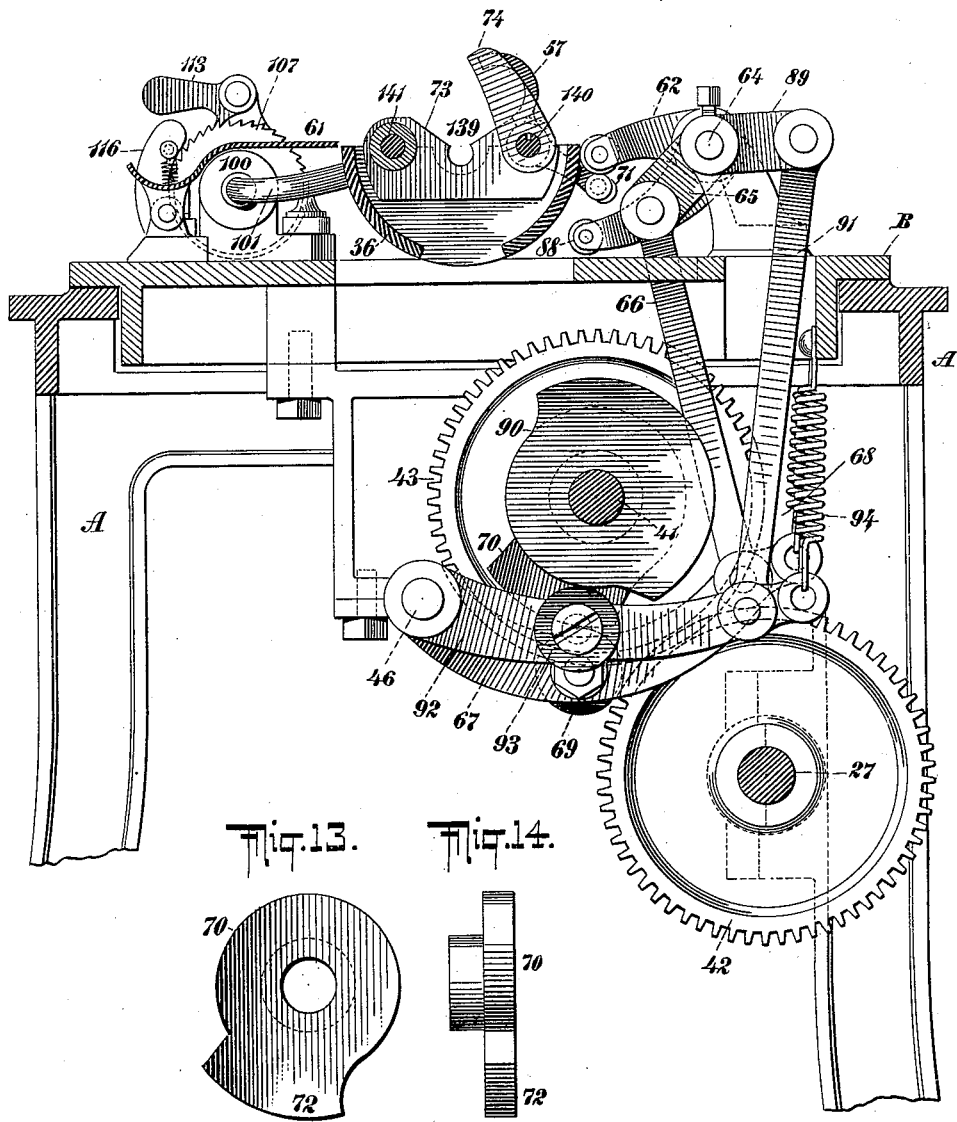

(No Model.) 10 Sheets—Sheet 7.
J. R. WILLIAMS.
CIGAR MAKING MACHINE.
No. 595,799. Patented Dec. 21, 1897.
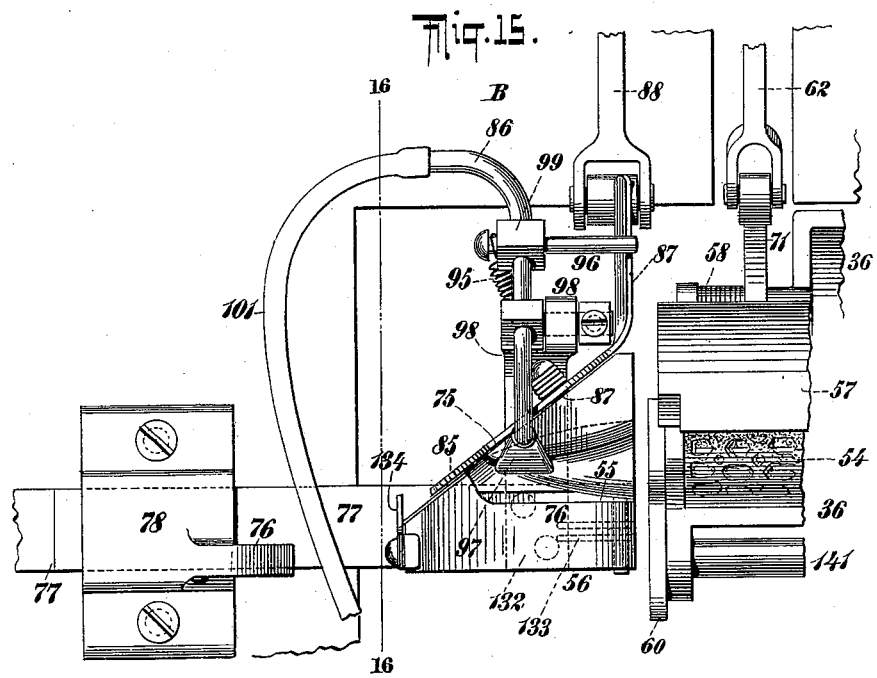
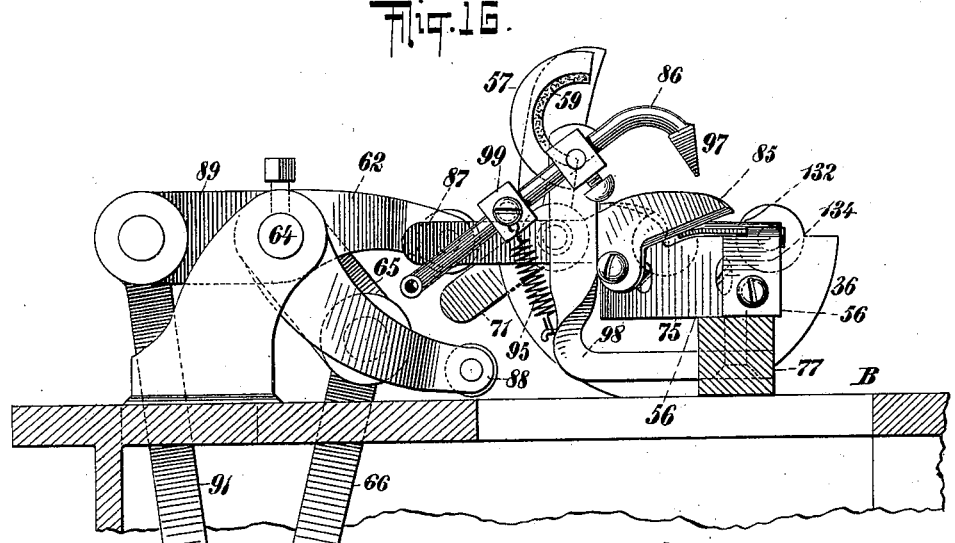
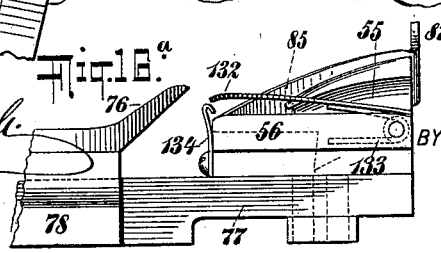
WITNESSES
Gustave Dieterich
John Kehlenbeck
INVENTOR
J. R. Williams
BY Chas. E. Gill
ATTORNEY (No Model.) 10 Sheets—Sheet 8.
J. R. WILLIAMS.
CIGAR MAKING MACHINE.
No. 595,799. Patented Dec. 21, 1897.
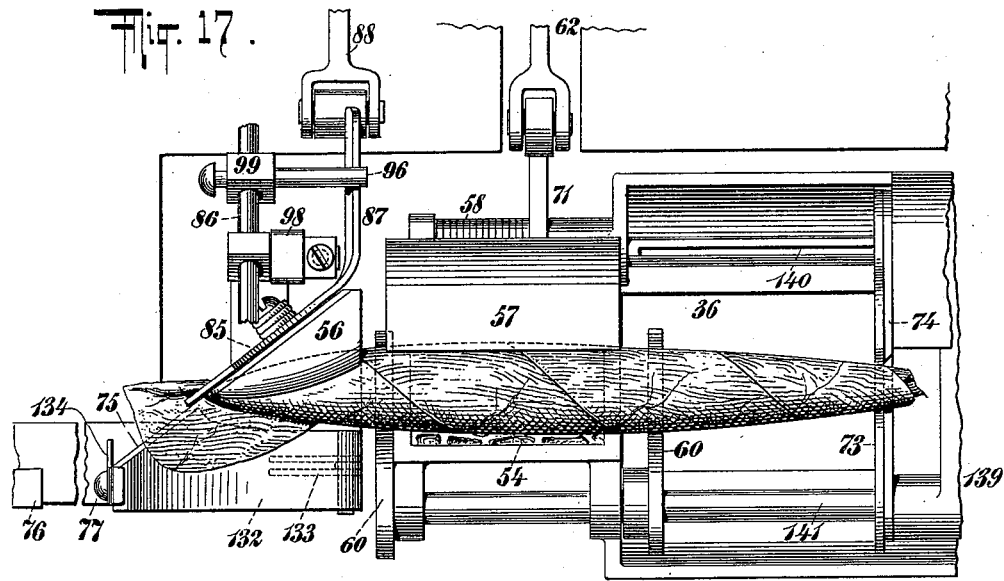
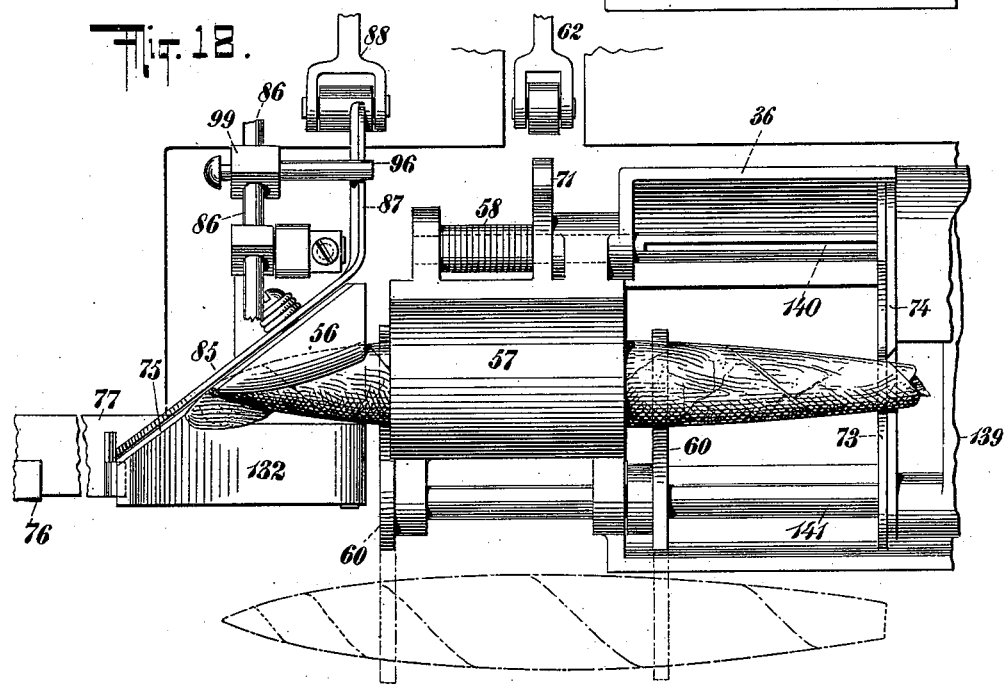
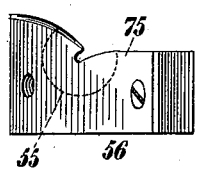
WITNESSES:
INVENTOR
John R. Williams
BY
Chas. C. Gill
ATTORNEY

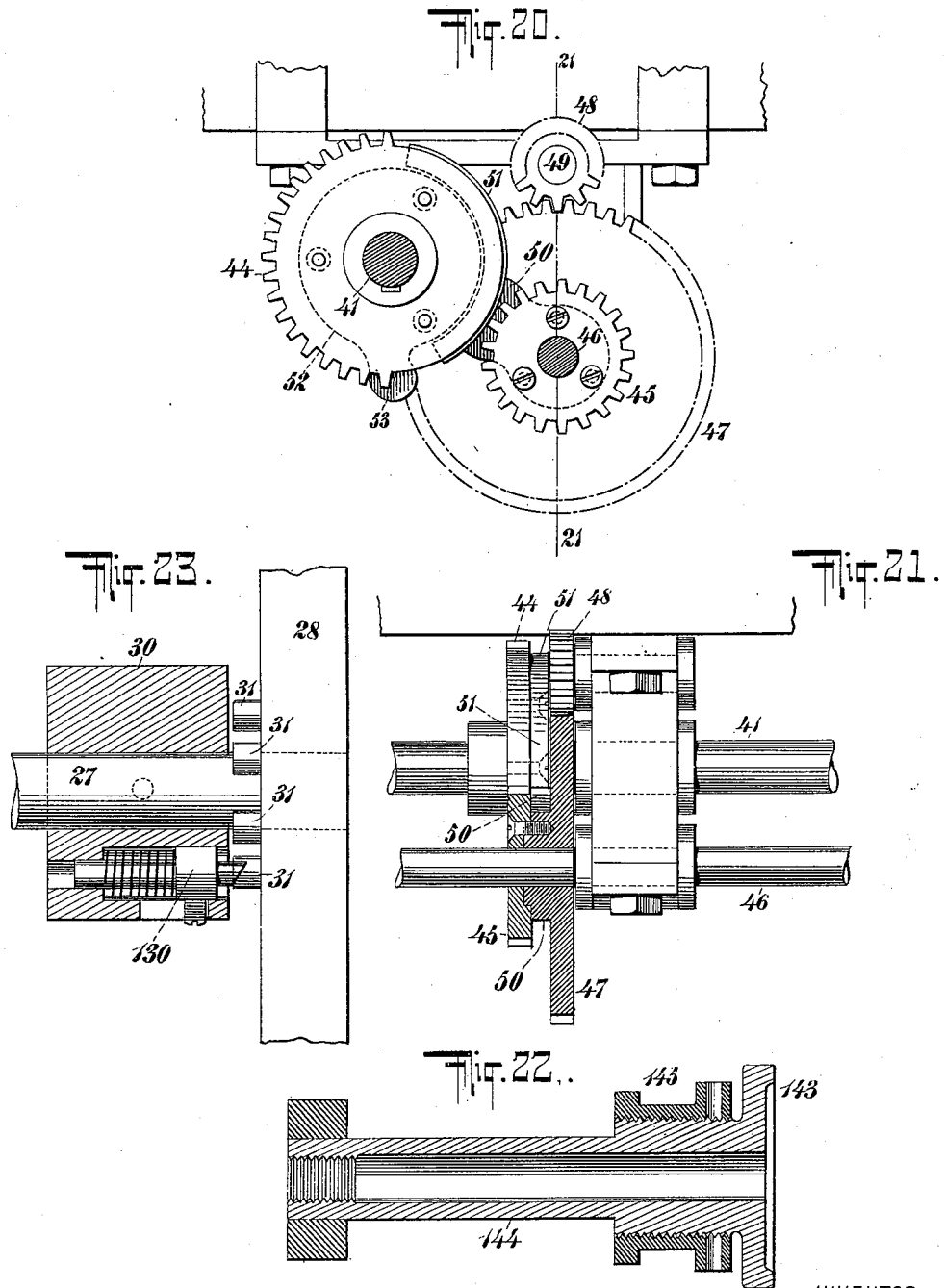

(No Model.) 10 Sheets—Sheet 10.
J. R. WILLIAMS.
CIGAR MAKING MACHINE.
No. 595,799. Patented Dec. 21, 1897.
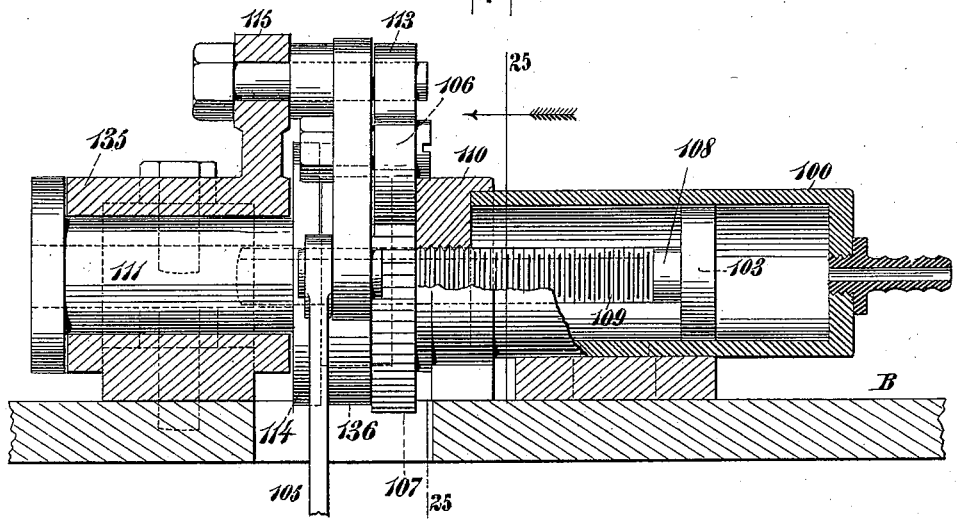
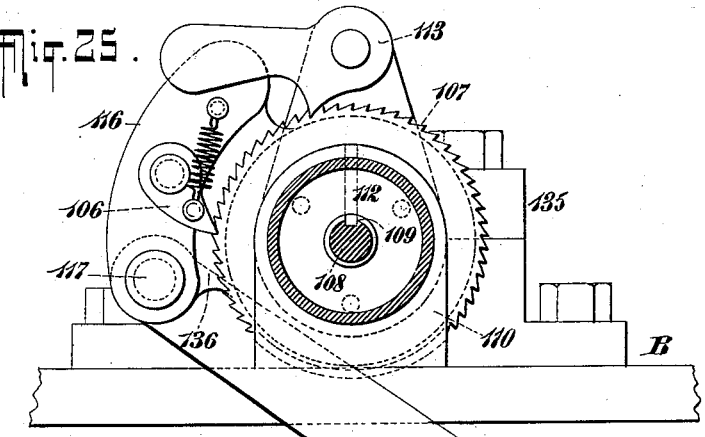
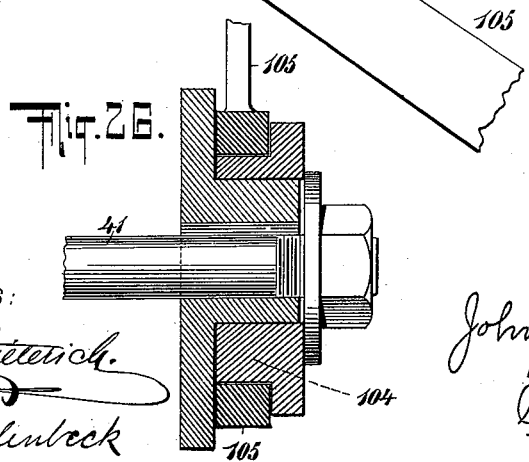
WITNESSES:
INVENTOR
John R. Williams
BY
Chas. E. Gill
ATTORNEY.

UNITED STATES PATENT OFFICE.

JOHN R. WILLIAMS, OF EAST ORANGE, NEW JERSEY, ASSIGNOR TO THE JOHN R. WILLIAMS COMPANY, OF NEW YORK, N. Y.

CIGAR-MAKING MACHINE.

SPECIFICATION forming part of Letters Patent No. 595,799, dated December 21, 1897.

Application filed July 15, 1897. Serial No. 644,594. (No model.)

*To all whom it may concern:*

Be it known that I, JOHN R. WILLIAMS, a citizen of the United States, residing at East Orange, in the county of Essex and State of New Jersey, have invented certain new and useful Improvements in Cigar-Making Machines; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

The invention relates to improvements in cigar-making machines, and particularly to machines for forming the head ends of cigars.

In accordance with my invention the cigar after having been wrapped and while the end of the wrapper is loose and projecting from the end of the cigar ready to be finally applied and the head of the cigar finished in the usual manner is introduced to the machine made the subject hereof, and the said projecting end of the wrapper is by means of said machine and without the employment of hand labor applied to the end of the cigar and the latter finished to completion.

I have termed the machine made the subject hereof a "cigar-heading machine," since, as above indicated, the wrapper is applied by any of the usual methods to the body of the cigar, leaving the end of the wrapper loose at the head of the cigar, and the head of the cigar is then completed by said machine.

I have embodied my invention in the machine shown in the accompanying drawings, said machine comprising a revoluble frame having a clamp in which the cigar to be finished or headed is placed, a thimble having a cone-shaped recess to receive the head end of the cigar held by the said clamp, a knife for trimming the projecting end of the leaf at the head end of the cigar, pasting devices for properly applying an adhesive substance to the leaf in order to secure it permanently in place, means for trimming the tuck end of the cigar, means for ejecting the cigar from the said revoluble frame after the cigar has been completed, and operative mechanism for actuating the various parts hereinbefore referred to.

The object of the invention is to diminish the time, labor, and expense incident to finishing the heads of cigars and to produce a machine which will automatically and perfectly finish the cigars, the latter when ejected from the machine being ready for the market.

The invention will be fully understood from the detailed description hereinafter presented, reference being had to the accompanying drawings, in which—

Figure 1 is a top view of a machine constructed in accordance with and embodying the invention. Fig. 2 is an end view of same, looking at the right-hand end of the machine. Fig. 3 is a detached elevation of one of the cams forming a part of the operative mechanism of the machine and which will be specifically referred to hereinafter. Fig. 4 is an edge view of same. Fig. 5 is an end view, partly broken away, of the left-hand end of the machine. Fig. 6 is a face elevation of one of the operative cams of the machine. Fig. 7 is an edge view of same. Fig. 8 is a rear elevation, partly broken away, of the machine. Fig. 9 is a vertical transverse section through the machine on the dotted line 9 9 of Fig. 1 and looking in the direction of the arrow. Figs. 10 and 11 respectively show the side and edge of one of the operative parts connected with the driving-gearing of the machine and are specifically referred to hereinafter. Fig. 12 is a vertical transverse section through the machine on the dotted line 12 12 of Fig. 1 and looking in the direction of the arrow. Figs. 13 and 14 respectively show the face and edge of one of the cams of the machine. Fig. 15 is an enlarged detached view of a portion of the revoluble frame, thimble, and pasting mechanism of the machine. Fig. 16 is a vertical section of same on the dotted line 16 16 of Fig. 15. Fig. 16$^a$ is a detached front elevation of the thimble, with the table thereon shown in its elevated position, and of a portion of the guide having the finger which at the proper time presses said table downward that it may be caught by the spring-catch on the end of said thimble. Fig. 17 is a view corresponding substantially with Fig. 15, but showing the cigar placed in position for the subsequent operation of being rolled at its head end and trimmed at its tuck end. In this figure the clamp for holding the cigar, the knife for trimming the tuck end of the cigar, and the knife coöperating with the thimble are in their upper positions. Fig. 18 is a view corresponding with Fig. 17, but showing the clamp as having descended upon the cigar to hold the latter in the revoluble frame and showing also the cigar as having been turned sufficiently to draw the lap end of the leaf partly within the thimble and around the head of the cigar. This figure shows the knife which coöperates with the thimble in its lower position and by dotted lines indicates the action of the ejector-fingers in throwing the finished cigar forward from the revoluble frame and toward the operator. Fig. 19 is a detached end view of the thimble which receives the head end of the cigar. Fig. 20 is a detached vertical section through the driving-shaft and fulcrum-shaft and illustrating the gearing by which power is transmitted from said driving-shaft to the revoluble frame holding the cigar during a portion only of the revolution of the main driving-shaft. Fig. 21 is a vertical section of same on the dotted line 21 21 of Fig. 20. Fig. 22 is a central vertical longitudinal section through a portion of the revoluble frame carrying the cigar, this portion being a sleeve and jam-nut by which, in connection with a longitudinal screw, a slide carrying the tuck-cutting knives may be adjusted in said revoluble frame to meet the varying lengths of cigars. Fig. 23 is a detached vertical section through the clutch connected with the main driving-shaft of the machine and by which the motion of the belt-wheel may be imparted to or cut off from the said driving-shaft. Fig. 24 is a central vertical longitudinal section, partly broken away, of the paste-cylinder for supplying paste to the leaf at the head end of the cigar held by the thimble. Fig. 25 is a vertical section of same on the dotted line 25 25 of Fig. 24; and Fig. 26 is a detached vertical section through the eccentric located on the end of the auxiliary driving-shaft for reciprocating the arm carrying the pawl for driving the ratchet shown in Fig. 25 connected with the pasting mechanism.

In the drawings, A denotes the supporting-frame of the machine; B, the bed-plate thereof; 27, the main power-shaft, and 28 the usual belt-wheel by which power may be applied to the shaft 27 and from said shaft to the operative parts of the machine. The shaft 27 is provided with clutch mechanism of any suitable character, which will automatically cut off the power of the belt-wheel 28 from the shaft 27 at the end of each revolution of the latter.

The machine will be provided with a treadle, (not shown,) but connected to the pitman-rod 29, Figs. 2, 5, and 9, for effecting the engagement of the clutch and the consequent starting of the shaft 27 whenever desired. The clutch mechanism for stopping the shaft 27 at the end of each of its revolutions and the treadle for again starting the shaft 27 are well known in this art, and this invention is not limited to any special means for stopping or starting the shaft 27. In the drawings, however, the numeral 30 indicates the clutch-sleeve, and 31 a series of pins on the belt-wheel 30. Within the clutch-sleeve 30 is the usual slide 130 (see Fig. 23) for engaging the pins 31, said slide being spring-pressed toward said pins and normally in engagement therewith when unopposed by a force resisting said spring. In the present instance I provide the arm 32, having a blade 33, Figs. 2, 5, and 9, to disengage the clutch-slide 130 from said pins 31, and consequently to disengage the belt-wheel 28 from the shaft 27. The arm 32 is held in its upward position by a coiled spring 131, which when unopposed retains the arm 32 in its upward position, and when said arm is in its upward position the beveled end of the clutch-slide 130 will at the end of each revolution of the shaft 27 pass against the blade 33 of said arm 32, and thereby said slide will be driven inward and from the pins 31 of the belt-wheel 28 and the latter will revolve without affecting the shaft 27. The arm 32 is secured upon the short shaft 34, and upon this shaft, as shown in Fig. 5, is secured the arm 35, to which the treadle-rod 29 is connected. When the foot of the operator is pressed upon the treadle to pull downward on the rod 29, the arm 35 will rock the shaft 34 and pull the arm 32 downward free from the clutch, and at this time the clutch-slide 130 will engage the pins 31 of the belt-wheel 28, and the power of the latter will be imparted to the shaft 27 and through said shaft to the operative parts of the machine.

The revoluble frame carrying the cigar to be headed is designated by the numeral 36, and this frame has a circular end 37 and a substantially semicircular body, as indicated in Figs. 1, 9, and 12. The frame 36 is in the nature of a shell, and it is supported by and has its revoluble motion within the bearing 38, Fig. 1, which incloses the circular right-hand end of the said frame 36. Upon the end of the frame 36 is secured the gear-wheel 39, which engages a similar gear-wheel 40, Fig. 2, and the latter, through intermediate mechanism, receives its motion from the auxiliary driving-shaft 41, which receives its power from the main driving-shaft 27 through the intermeshing gear-wheels 42 and 43. (Clearly shown in Fig. 8.) The shaft 41 makes one revolution with every revolution of the shaft 27 and is stopped at the end of each revolution by the stoppage of the shaft 27, and the revoluble frame 36 will make about three and one-half revolutions during a partial revolution of the shaft 27, said revoluble frame 36 stopping prior to the stoppage of the shaft 27 and prior to the stoppage of the shaft 41. The revoluble frame 36 receives its motion from the shaft 41 through the segment-gear 44 on said shaft 41, Figs. 9, 20, and 21, which segment-gear 44 engages the loose pinion 45, which is free on the stationary fulcrum-shaft 46 and is connected with the large gear-wheel 47, also loose on said fulcrum-shaft 46. The loose gear-wheel 47 on the stationary shaft 46 is in engagement with the pinion-wheel 48, mounted on the inner end of the short shaft 49, said shaft 49 having upon its outer end the above-mentioned gear-wheel 40, Fig. 8, which is in direct engagement with the gear-wheel 39, secured upon the end of the revoluble frame 36. The revoluble frame 36 will be revolved during all of the time that the teeth of the segment-gear 44 are acting upon the loose pinion-wheel 45, and through said pinion-wheel 45 upon the loose gear-wheel 47, which is clearly illustrated in Figs. 8, 9, and 20, actuates the pinion-wheel 48, gear-wheel 40, and gear-wheel 39 to revolve the frame 36. It is desirable, however, that the loose gear-wheel 47 and pinion-wheel 45 shall at the proper time be locked against movement in order to hold the frame 36 stationary during such time as the shaft 41 continues to revolve after the segment-gear 44 has left said pinion 45, and hence intermediate the gear-wheel 47 and pinion-wheel 45, and preferably cast on said gear-wheel, is the locking-dog 50, Figs. 20 and 21, having a concave end and rigid with both the gear-wheel 47 and pinion-wheel 45, said locking-dog 50 thus revolving with said gear-wheel and pinion-wheel free on the fulcrum-shaft 46, which has no revoluble motion.

When the teeth of the segment-gear 44 are in engagement with the pinion-wheel 45, the locking-dog 50 performs no function whatever; but when the teeth of said segment-gear 44 have left their engagement with the pinion-wheel 45 the segment rim or flange 51 on the said segment-gear 44 and the concave end of the dog 50 will come together, the concavity of the end of the dog fitting the convexity of the said rim or flange 51 on the segment-gear 44, as shown in Fig. 20, whereby the said dog 50 will be locked against movement without interfering with the continued movement of the segment-gear 44 and shaft 41. The convex flange or rim 51 on the segment-gear 44 will move within the concavity of the dog 50 and thereby lock the said dog and the pinion-wheel 45 and gear-wheel 47 against movement. As soon as the end of the rim or flange 51, carried by the segment-gear 44, leaves the concave end of the dog 50 the teeth of said segment-gear 44 will pass into contact with the pinion-wheel 45 and again set said pinion-wheel and the gear-wheel 47 in motion. It is desirable that the strain of starting the pinion-wheel 45 and the parts intermediate the same and the revoluble frame 36 shall not come upon the teeth of the segment-gear 44 and pinion-wheel 45, and hence upon one face of the segment-gear 44 I provide the plate 52, (shown in Figs. 10, 11, and 20,) having the toe 53, which projects outward sufficiently to contact with the corner of the dog 50 at the time when the flange or rim 51 of the segment-gear 44 leaves said dog, and the purpose of this contact of the toe 53 with the corner of the dog 50 is thereby to start the revoluble motion of the loose pinion-wheel 45 and gear-wheel 47 just at the time when the segment-gear 44 is commencing its engagement with said pinion-wheel 45. In this manner the strain of starting the wheel 45 and its connected parts is removed from the teeth of the said wheel 45 and the segment-gear 44 and taken by the toe 53, acting on the dog 50. The revoluble frame 36 thus receives its motion from the driving-shaft 27 through the gear-wheels 42 and 43 (which communicate the power of said shaft 27 to the shaft 41) and thence through the segment-gear 44, pinion-wheel 45, gear-wheel 47, pinion-wheel 48, short shaft 49, gear-wheel 40, and gear-wheel 39, the latter being directly on the end of said frame 36, and said frame 36 is given a rapid revoluble motion as compared with the motion of shafts 27 and 41 and revolves during only a part of the revolution of the shaft 41 by reason of the segment-gear 44 engaging said pinion 45, and said revoluble frame 36 is locked against movement during the concluding portion of the revolution of the shaft 41 by means of the locking-dog 50 and flange or rim 51. The strain of again starting the pinion-wheel 45 and its connected gearing leading to the frame 36 is taken from the teeth of the gear-wheels 44 and 45 by the contact of the toe 53 of the plate 52 with the dog 50 after the latter has been relieved from the rim or flange 51.

The revoluble frame 36 stops prior to the stoppage of the auxiliary driving-shaft 41, in order that the cams on said shaft 41 may prior to the stoppage of the shaft operate the mechanisms hereinafter described and which mechanisms act when the frame 36 is at rest.

The cigar to be headed is placed upon a soft pad 54, located adjacent to the open end of the frame 36, and the head end of the cigar, with the end of the wrapper projected outward therefrom, is placed within the concavity 55 of the thimble 56, (see Fig. 17,) and said cigar is thus held upon the pad 54 of the frame 36 with its head end projected within the concavity of the thimble 56 by means of the clamp 57, (see Fig. 18,) which has a spring tension toward the cigar upon the pad 54 by reason of the coiled spring 58. It will be understood that the frame 36, receiving the body of the cigar, revolves while the thimble 56, receiving the head end of the cigar, remains stationary so far as any revolving motion is concerned, said thimble 56 having merely at the proper time a sliding or reciprocating motion toward and from the open end of the frame 36. The clamp 57 is shown in its open position in Fig. 16, wherein it will be seen that said clamp is lined with a soft padding 59 to prevent injury to the cigar held by it.

At opposite ends of the pad 54, placed within the frame 36 to receive the body of the cigar, are the ejector-fingers 60 60, these fingers being concave at their inner ends to permit the cigar to be placed over them and upon the pad 54, and being utilized after the completion of the cigar to throw the finished cigar upward and frontward toward the operator, (see Fig. 18,) a plate 61 (shown by dotted lines in Fig. 1 and full lines in Fig. 12) being preferably provided to receive the cigars as they are one after another ejected from the frame 36 by means of the fingers 60. The fingers 60 operate together and constitute an ejector for discharging the finished cigars from the frame 36.

When the frame 36 is in its normal position ready to receive a cigar to be treated, the ejector-fingers 60 will be in their lower position and the clamp 57 will be in its upper position, (shown in Figs. 16 and 17,) said clamp being there held by the arm 62, secured upon the rock-sleeve 63, Fig. 1, which sleeve is free on the rock-shaft 64 and has secured upon its end the arm 65, which is pivotally connected to the upper end of the rod 66, extending downward through the bed-plate B of the machine (see Fig. 12) to the transverse arm 67, which is hung from the shaft 46 and carries the roller 69 in contact with the cam 70, secured upon the auxiliary driving-shaft 41. A coiled spring 68 (shown more clearly in Fig. 8) retains the roller 69 against the periphery of the cam 70, the latter being clearly shown as to its form in Figs. 13 and 14.

The purpose of the cam 70, arm 67, arm 66, arm 65, sleeve 63, and arm 62, carried by said sleeve, is to open the lid or clamp 57 from the cigar at the proper time and to retain said lid or cover open preparatory to a cigar to be treated being placed upon the pad 54 ready to be held by said clamp 57, after which the cam 70 will permit the spring 58 to close said clamp 57 upon the cigar and to maintain the same in its closed position during the revoluble motion of the frame 36 and until the proper time has arrived for the finished cigar to be ejected from said frame 36 by means of the fingers 60. The clamp 57 is provided with the rearwardly-projecting arm 71, (shown in Figs. 1, 12, 16, 17, and 18,) against which the arm 62 acts to open the clamp. When the projection 72 of the cam 70 is acting against the roller 69, carried by the jointed arms 66 and 67, the said arm 66 and the arm 65, connected therewith, will be pulled downward and rock the sleeve 63 and arm 62 forward and downward, the latter at such time contacting with the upper surface of the clamp-arm 71 and thereby depressing said clamp-arm 71 and elevating the clamp 57 against the opposition afforded by the tension of the spring 58. After the projection 72 on the cam 70 leaves the roller 69, carried by the jointed arms 66 and 67, the spring 68 will be permitted to draw the arm 66 upward and thereby through the arm 65 and sleeve 63 elevate the arm 62 entirely clear of the clamp-arm 71, at which time the spring 58, being thus relieved, may close the clamp 57 and maintain it in its closed position until the projection 72 of the cam 70 again operates to depress the jointed rods 66 67 and thereby again cause the arm 62 on the sleeve 63 to press downward upon the clamp-arm 71 for the purpose of again elevating the clamp and freeing the cigar. When the machine is at rest and in its normal condition, the projection 72 of the clamp 70 will be in about the position in which it is shown in Fig. 12, said projection being against the roller 69 of the jointed arms 66 and 67 and maintaining the clamp 57 in its elevated position ready to be brought downward upon a cigar to be placed upon the pad 54. When the cigar to be treated is placed upon the pad 54 and the machine set in motion, the projection 72 of the cam 70 will almost immediately leave the jointed rods 66 and 67 and thereby permit the clamp 57 to close upon the cigar, and the clamp will remain closed upon the cigar during all the revoluble movement of the cigar-carrying frame 36, said clamp 57 being permitted to remain closed by the narrower or inner portion of the cam 70, which, as may be seen upon reference to Fig. 13, is of much greater extent than the projecting portion 72 of said cam. During the first portion of the revolution of the cam 70, therefore, the clamp 57 will be closed upon the cigar and will remain closed upon the cigar during the three and one-half (about) revolutions of the revolving frame 36, and then during the continued motion of the auxiliary driving-shaft 41 the cam 70, through its projection 72, will again act upon the jointed rods 66 and 67 to open the clamp 57 from the cigar, the clamp 57 being opened prior to the conclusion of each revolution of the driving-shaft 41 and cam 70. In view of the fact that the clamp 57 is closed during the first portion of the revolution of the cam 70 and is open during the latter portion of the revolution of said cam the machine when arrested at the end of the revolution of the driving-shaft is left in condition to receive another cigar to be treated.

When the cigar is upon the pad 54, its tuck end will rest upon the cutter 73 and its head end will be within the cavity 55 of the thimble 56. After the rolling of the head of the cigar by the revoluble motion of the frame 36 the tuck end of the cigar will be trimmed by the cutter 73 coöperating with the oscillatory cutter-blade 74, (whose operative connections will be hereinafter described,) and after the trimming of the cigar by the cutters 73 74 the lid 57 elevates and the ejector-fingers 60 then throw the cigar forward upon the receiving-plate 61. (Shown by dotted lines in Fig. 1 and by full lines in Fig. 12.) The mechanism for operating the oscillatory cutter-blade 74 and the ejector-fingers 60 will be explained hereinafter in appropriate places.

The thimble 56 is a practically solid piece of metal, having the cavity 55 in line with the pad 54 of the frame 36 and having the angular surface 75 at its end farthest from the said frame 36. The cavity 55 of the thimble 56 has its walls converging toward one another as they approach the angular surface 75, said walls being of the form it is desired the end of the cigar will have when finished. The thimble 56 also has by preference the hinged table 132, which, as shown in Figs. 15 and 16ª, is of sheet metal and covers the outer upper portion of said thimble. The table 132 is capable of being elevated at its outer or left-hand portion by means of the wire spring 133, Fig. 16ª, and of being locked downward at said portion by the spring-catch 134. The table 132 is held in its downward position by the catch 134 at the time the cigar to be headed is placed in the frame 36 and thimble 56, and the projecting portion of the wrapper will be extended over upon said table, as shown in Figs. 17 and 18, and thereafter when the knife (numbered 85) hereinafter described descends to trim off the wrapper overhanging the thimble 56 its end will contact with said catch 134 and spring the same out from the table 132, thereby permitting the latter to spring upward to the position shown in Fig. 16ª and elevate the loose end of the wrapper on a line descending from above the center of the pointed end of the cavity 55 toward the larger part of said cavity. Thus when the cigar is in condition to be rolled in the machine the loose end of the wrapper will be not only turned upward by reason of the table 132 being in its upward position, but will be held on an inclined line corresponding with the inclination of said table 132, the higher end of the wrapper being at the point of the cigar; and the main purpose of thus maintaining the wrapper preparatory to the latter being rolled around the head end of the cigar is to insure the movement of the wrapper during the turning of the cigar toward the thicker part of the head end of the cigar instead of toward the point of said head end. In this manner a solid even point is formed on the head end of the cigar and the wrapper is prevented from bunching at the point of the cigar or creating a loose formation at said point. The table 132 is not in all cases a necessary feature of the thimble 56, but is a desirable adjunct to said table when the tobacco-leaf, owing to its texture, treatment, and other conditions, is soft and flabby and has a tendency to hug against the upper surface of the thimble. When the leaf is in a condition in which it will not have to be simply dragged over the upper forward portion of the thimble 56, the table 132 may be omitted.

I have employed the thimble 56 shown in the drawings both with and without the table 132 in the practical manufacture of cigars and find that the table 132 is not necessary when some classes of leaf are used for the wrappers and that the table 132 is a very useful adjunct to secure perfect results when other classes or conditions of leaf are used for the wrappers. The thimble 56 is secured to the slide 77, which is adapted to reciprocate in the guide 78 under the oscillating action of the arm 79, the movement of the thimble 56 and slide 77 being a limited one and being directly in line with the pad 54, held in the frame 36. When the thimble 56 is adjacent to the frame 36, the table 132 will be held in its lower position by the spring-catch 134, said table 132 remaining in its lower position until said catch 134 is freed from the end of said table 132 by the contact of the cutting-blade 85 with said catch, as above described. After the cigar has been rolled and completed the thimble 56 and slide 77 move outward from the frame 36, so as to release the head end of the cigar from the cavity 55 in said thimble, and this outward movement of the thimble 56 from the frame 36 I utilize in the closing of the table 132 downward to be engaged by the catch 134, and upon reference to Figs. 15 and 16ª it will be noticed that upon the guide 78 is provided a finger 76, beneath which the outer edge of the thimble 56 passes on its outward movement to the left. When the outer end of the thimble 56 passes below the finger 76 on the guide 78, the outer end of the table 132 will strike the finger 76 and be by the same depressed sufficiently for the spring-catch 134 to engage said table 132 and lock it in its lower position. Thus when the thimble 56 again starts to the right to coöperate with the revoluble frame 36 the table 132 will be in its lower position and be there held by the spring-catch 134 preparatory to the head of the cigar being placed within the cavity 55 and the projecting end of the wrapper being spread upon the said table 132.

As above described, after the wrapper has been placed upon the table 132 the knife 85 will descend to trim off that portion of the wrapper overhanging the angular edge 75 of the thimble 56, and in performing this function the end of the knife 85 will come into contact with the spring-catch 134 and press the same outward sufficiently for the table 132 to spring upward into the position in which it is shown in Fig. 16ª, in which position it will hold the wrapper in proper condition to be accurately wrapped upon the head end of the cigar.

When the cigar is placed upon the frame 36, its head end will at the same time be introduced into the thimble 56, and at this time the thimble 56 will be in position adjacent to the frame 36, as shown in Figs. 17 and 18, but after the cigar has been rolled and finished the thimble 56, under the action of the slide 77 and arm 79, will move toward the left from said frame 36 and thus relieve itself from the cigar, which thereafter may be conveniently thrown frontward upon the receiving-table 61 by the ejector-fingers 60. The movement of the thimble 56 and slide 77 toward the frame 36 is imparted from the auxiliary driving-shaft 41 through the cam 80 (see Figs. 5, 6, 7, and 8) on said shaft acting against the roller 81, secured to the angle-arm 82, the latter being connected with the lower end of the vertical rock-shaft 83, to the upper end of which the arm 79, connected with said slide 77, is secured.

The movement of the thimble 56 and slide 77 from the frame 36 is secured by the spring 84, Fig. 8, on said vertical shaft 83, and which spring retains the roller 81 against the said cam 80, the latter thereby controlling said spring and the outward movement of said thimble 56. The mechanism just above referred to for imparting movement to the thimble 56 is shown more clearly in Figs. 1, 5, 6, 7, and 8, the cam 80 being shown in detail in Figs. 6 and 7. The projecting portion of the periphery of the cam 80 retains the thimble 56 stationary and in position adjacent to the frame 36 during almost the entire revoluble motion of the frame 36, carrying the cigar; but just as the frame 36 comes to a full stop the depression in the cam 80 will reach the roller 81 and permit the spring to withdraw the thimble 56 and slide 77 outward from the frame 36 and from the head of the cigar.

The wrapper for and while partly wrapped around the cigar is both trimmed and pasted at its end while the cigar is in the frame 36 and thimble 56, the trimming being performed by the knife 85, above referred to, and the pasting through the nozzle 86, as more clearly illustrated in Figs. 1, 15, and 16. The knife 85 is secured upon a pin or screw close against the angular surface 75 of the thimble 56, as shown in Fig. 16, and said knife 85 is provided with the shank end 87, which is acted upon by the crank-arm 88, secured upon the left-hand end of the rock-shaft 64, the latter, as illustrated in Fig. 1, being within the sleeve 63 and having at its right-hand end the arm 89, by which, as more clearly shown in Figs. 12 and 16, the said shaft 64 and arm 88 are actuated and controlled by the cam 90, Fig. 12, secured upon the auxiliary driving-shaft 41. The arm 89 is pivotally secured by the connecting-rod 91 to the arm 92, which carries the roller 93 in contact with the said cam 90. During the revolving of the shaft 41 and cam 90 the latter, pressing on the roller 93, will drive the arm 92 and rod 91 downward, and thereby cause the rock-shaft 64 and arm 88 to turn upward, said arm 88 turning upward against the shank end 87 of the knife 85 and causing the blade portion of said knife to descend along the angular surface 75 of the thimble 56 and cut off all that portion of the leaf overhanging said angular portion 75 of the thimble 56. The depression in the cam 90 permits the spring 94 for the rod 91 and arm 92 to rock the shaft 64 and arm 88 thereon forward and downward, thereby relieving said arm 88 from the shank of the knife 85 and permitting said knife to elevate under the tension of the spring 95, (illustrated clearly in Figs. 15 and 16,) which spring 95 acts upon the shank 87 of the blade through the medium of the pivoted nozzle 86 and arm 96, carried thereby. The arm 96 is above the shank 87 of the blade 85, and hence when the arm 88 has descended from said shank 87 the spring 95, acting through the arm 96, will pull said shank downward and turn the cutting portion of the blade upward. Thus the blade 85 is moved downward to trim the wrapper at the head end of the cigar, from the driving-shaft 41 through the medium of the arm 88, rock-shaft 64, arm 89 on said shaft, connecting-rod 91, cam-arm 92, and cam 90, and said blade is turned upward after performing the operation of trimming the leaf by means of the spring 95 and arm 96, said spring 95 and arm 96 being permitted to act by the depression in the cam 90, which allows the spring 94 to turn the rod 91 and arm 92 upward, and thereby rock the shaft 64 and arm 88 forward and downward.

The nozzle 86, to which the arm 96 is connected, is in the nature of a hollow tube having a broadened discharge end 97, and is primarily used to convey the paste to that portion of the wrapper to be applied to the head end of the cigar. The nozzle 86 is pivotally secured to the standard 98, (shown more clearly in Fig. 16,) which is secured to and travels with the slide 77 and thimble 56. The spring 95, above referred to, is at one end secured to the standard 98, as shown in Fig. 16, and at its other end to the adjustable block 99, secured upon said nozzle 86. The block 99 carries the arm 96, which is over the shank 87 of the blade 85. By adjusting the block 99 on the nozzle 86 the tension of the spring 95 may be regulated at will. The broadened discharge end 97 of the nozzle 86, when said nozzle is in its lower position, is in close proximity to the wrapper extending outward from the concavity 55 of the thimble 56 and discharges its paste in limited quantities upon the exposed upper surface of said wrapper. The broadened end 97 of the nozzle 86 when in its lower position helps to retain the wrapper while drawn inward by the revolving of the cigar in a smooth and uniform condition, and hence when the cigar leaves the thimble 56 its head is entirely smooth and without wrinkles or other roughness.

The nozzle 86 receives its paste from the reservoir or cylinder 100, to which it is connected by the flexible tube 101, as clearly shown in Fig. 1, and said nozzle 86, being pivotally secured to the standard 98, receives its upward movement (shown in Fig. 16) by the tension of the spring 95, when the arm 88 on the rock-shaft 64 descends to permit said spring 95 to act, the said spring 95, when the arm 88 is in its lower position, serving both to elevate the discharge end of the nozzle 86 and the cutting portion of the blade 85, and hence it will be observed that when the cutting portion of the blade 85 is in its upward position the nozzle 86 will also be in its upward position. When the arm 88 ascends against the shank of the blade 85 to depress the cutting portion of the latter, the said shank will ascend against the arm 96, connected with the nozzle 86, and depress the discharge end of said nozzle. The blade 85 and nozzle 86 thus have a simultaneous action upon their pivotal supports both upward and downward, the object being to apply the paste to the wrapper from the nozzle 86 after the knife 85 has descended to trim the leaf and to cause the broadened end 97 of said nozzle to close a part of the outer end of the cavity 55, which receives the head end of the cigar.

As above described, the paste for the nozzle 86 is supplied by the reservoir or cylinder 100, which is removably secured to the bed-plate B by means of the clamps 102, as more clearly shown in Fig. 1, and said cylinder 100 contains a reciprocating plunger 103, Fig. 24, which is caused by a slow intermittent motion to travel inward toward the discharge end of said cylinder 100 and drive the paste therein in limited quantities into the tube 101, and thence through the nozzle 86 to the wrapper on the thimble 56.

The plunger 103 has its inward movement imparted to it from the driving-shaft 41 by means of the eccentric 104, Figs. 5, 8, and 26, on said shaft, which eccentric, during the revolving of the shaft 41, imparts a limited reciprocating motion to the rod 105, which rod 105 extends upward and actuates the driving-pawl 106, Figs. 24 and 25, to move the ratchet-wheel 107.

The plunger 103 in the cylinder or reservoir 100 is connected with the screw-threaded stem 108, as clearly illustrated in Fig. 24, and this threaded stem is provided with the longitudinal keyway 109 and passes through the internally-threaded rigid sleeve 110, which caps the outer end of the cylinder or reservoir 100. The ratchet-wheel 107, above referred to, is fastened upon the right-hand end (shown by dotted lines in Fig. 24) of the cylinder 111, which cylinder has a pin 112 extending into the longitudinal keyway 109 of the threaded stem 108. The cylinder 111 and ratchet-wheel 107 revolve together under the force of the driving-pawl 106, and during the revolution of the ratchet-wheel 107 and cylinder 111 the pin 112 carried thereby will force the piston rod or stem 108 to turn axially, and during this turning movement of the piston rod or stem 108 it will be forced to move longitudinally by reason of the fact that its thread is in engagement with the interior thread of the stationary sleeve 110. Thus with every thrust of the rod 105 the pawl 106 will turn the ratchet 107, cylinder 111, and, owing to the pin 112, the piston rod or stem 108, and during the revolving motion of this stem 108 the internally-threaded sleeve 110 will cause said rod to have a longitudinal motion. The pin 112 loosely enters the keyway 109 of the stem 108, and hence said stem is permitted to have a longitudinal movement without losing its engagement with said pin 112. A stop-pawl 113 of usual character is provided for the ratchet-wheel 107, as more clearly shown in Fig. 25. The cylinder 111 receives the ratchet-wheel 107 on its right-hand end and turns with said ratchet-wheel, and said cylinder is mounted in the bearing 135 and receives between its integral collar 114 and the ratchet-wheel 107 the free collar 136, which is formed with a projecting plate 116, as more clearly illustrated in Fig. 25, to which the rod 105 is pivoted, as at 117, and which receives the usual pawl 106, above referred to, the latter, as shown in Fig. 25, having a tension toward the ratchet 107 by means of a coiled spring. With every thrust of the rod 105 the collar 136 with its plate 116 is given a limited axial motion determined by the eccentric 104, and during the upward movement of the rod 105 the pawl 106 will simply slide over the teeth of the ratchet, but during the downward movement of the rod 105 and plate 116 the pawl 106 will drive the ratchet 107 to have a limited revolving motion and to impart its motion to the cylinder 111 and threaded piston rod or stem 108, as above explained. The eccentric 104 on the end of the driving-shaft 41 is shown in section in Fig. 26, and may be of any usual character, its purpose being simply to impart a limited motion to the rod 105 in order that the latter may effect the movement of the piston 103 against the paste within the cylinder or reservoir 100 in order to expel the paste into the flexible tube 101 and nozzle 86, and thence from said nozzle upon the upper exposed surface of the wrapper held by the thimble 85. The bearing 135 has cast with it a standard 115 to receive the pin supporting the stop-pawl 113, as shown in Figs. 24 and 25. The cylinder 111 at its outer portion freely receives the outer part of the threaded rod 108, as shown by dotted lines in Fig. 24 and full lines in Fig. 1, and constitutes a hub which may revolve within the bearing 135.

It has been described above that the cigar to be treated is placed upon the pad 54 and across the ejector-fingers 60, the tuck end of the cigar resting upon the cutter 73 and the head end of the cigar being within the cavity 55 of the thimble 56. The cigar having been thus placed in position, the clamp 57 descends upon it, and this is immediately followed by the descent of the knife 85 to trim the leaf overhanging the thimble 56. The downward movement of the knife 85 is practically simultaneous with the downward movement of the paste-nozzle 86, and upon the knife 85 and nozzle 86 having reached their lower positions the frame 36 will commence to revolve and will revolve sufficiently to complete the head end of the cigar, whereupon the frame 36 will stop, the thimble 56 just prior to the stoppage of the frame 36 will slide outward free from the head of the cigar, and then the knife 74 will descend to coöperate with the knife 73 in trimming the tuck end of the cigar, immediately after which the clamp 57 will elevate to free the cigar and the ejector-fingers 60 will turn upward to throw the finished cigar forward upon the plate 61. The mechanisms for effecting all of the results just above specified have been hereinbefore described, with the exception of the mechanism connected with the cutters 73 and 74 and the ejector-fingers 60, and these elements will now be described. The cutters 73 and 74 will first be referred to, since they act prior to the operation of the ejector-fingers 60 for throwing out the completed cigar.

The form of the cutter 73 is clearly illustrated in Fig. 12, and this cutter 73 is secured upon a slide 139, Figs. 1, 17, and 18, which is mounted upon the rods 140 and 141, extending lengthwise of the revoluble frame 36. The rod 140 operates the knife 74 and the rod 141 carries the fingers 60. The slide 139 is adjustable upon the rods 140 and 141 in order to adapt the cutters 73 and 74 for the varying lengths of cigars, and hence when the longer cigars are to be treated the slide 139 will be moved outward to the right on the rods 140 and 141, and when shorter cigars are to be treated the slide 139 will be moved toward the ejector-fingers 60. The movement of the slide 139 is effected by the screw 142, which engages the said slide 139 and the sleeve 144, (shown enlarged in Fig. 22,) which receives said screw 142 and has at its outer end the head 143, by which it may be conveniently turned. The screw 142 within the sleeve 144 is engaged by the internal thread of the latter, and said sleeve is revoluble within the head of the frame 36 and is provided with a jam-nut 145, the latter being utilized to lock the sleeve 144 and through said sleeve to lock the screw 142 in its adjusted position and prevent the same from becoming loosened or changing position during the revoluble motion of the frame 36. By turning the sleeve 144 the screw 142 and slide 139 may be moved longitudinally at will to adjust the cutters 73 and 74 to suit the varying lengths of cigars. The sleeve 144 has no longitudinal motion, but only a revoluble motion, and hence when turned by the hand of the operator said sleeve will impart a longitudinal motion to the screw 142 and slide 139. The frame 36, slide 139, and rods 140 and 141, with the parts carried by said rods, all revolve together as an integral structure, and after the frame 36 has ceased to revolve the knife 74 trims the tuck end of the cigar, and the fingers 60 thereafter eject the finished cigar. The frame 36 comes to a stop after completing about three and one-half revolutions and prior to the completion of one revolution of the driving-shaft 41, and it is during the concluding portion of the one revolution of the driving-shaft 41 that the knife 74 descends to trim the tuck end of the cigar, the clamp 57 ascends to free the cigar, and the fingers 60 turn upward to eject the finished cigar. The knife 74 is on the rod 140, intermediate the knife 73 and the slide 139, and hence moves with said slide and preserves its relation to the knife 73. The rod 140 is provided with an elongated groove 146, as shown in Fig. 1, wherein the knife 74 is keyed to said shaft 140, and which groove 146 permits of the sliding movement of the knife 74 under the action of the slide 139 and screw 142 without any disengagement of said knife from said shaft, the shaft 140 being thus permitted to operate the knife 74 at any point at which the slide 139 may be adjusted on the rods 140 and 141. The knife 74 is normally held in its upward position by the coiled spring 147, acting on the rod 140, (see Fig. 1,) and remains in its upward position during all of the revoluble motion of the frame 36, carrying the cigar, and decends to trim the tuck end of the cigar after the frame 36 comes to a stop. The downward movement of the knife 74 is effected by the segment 148 (see Fig. 2) on the rock-shaft 149, (see Fig. 1,) which rock-shaft is actuated from the main driving-shaft and causes the segment 148 to move upward in engagement with the segment 150, which is on the right-hand end of the shaft or rod 140. When the segment 148 moves upward and engages the segment 150, the latter is thereby moved upward and turns the shaft 140 toward the operator, thus causing the knife 74 to descend and trim the tuck end of the cigar. The rock-shaft 149 is mounted in bearings 151 upon the bed-plate B, as shown in Fig. 1, and has at its left-hand end the arm 152, which is pivotally connected with the rod 153, the latter passing downward through the bed-plate B and having connected to its lower end the arm 154, as shown in Fig. 9, which arm carries a roller 155 in engagement with the cam 156, located on the driving-shaft 41. The arm 153 is given an upward tension by the spring 157, Figs. 8 and 9, whereby the roller 155 is kept in contact with said cam 156, and said cam is enabled at the proper time to depress the arm 154, rod 153, and arm 152, and thereby through the rock-shaft 149 turn the segment 148 upward to engage the segment 150 and effect the turning of the rod 140 to depress the knife 74 and enable the latter to trim the tuck end of the cigar. After the cigar has been trimmed by the knife 74 the depressed portion of the cam 156 will reach the roller 155 of the arm 154 and enable the spring 157 to pull upward on the arm 154, rod 153, and arm 152 and thereby turn the rock-shaft 149 to move the segment 148 downward to its normal position, (shown in Fig. 2,) and thus the segment 150 on the rod 140 will be fully released and the spring 147, Fig. 1, on the rod 140 will be enabled to maintain the knife 74 in its open position. The form of the cam 156 is clearly illustrated in Fig. 9, and the work of trimming the tuck end of the cigar is performed almost instantaneously while the projecting toe on said cam 156 is passing over the roller 155, carried by the arm 154, to throw the segment 148 upward against the segment 150, and as soon as the toe on said cam 156 leaves said roller 155 of the arm 154 the spring 157 will immediately return the segment 148 to its normal position (Shown in Fig. 2.) The action of the cam 156 through the intermediate mechanism to depress or turn downward the knife 74 occurs after the revoluble frame 36, carrying the cigar, has come to a stop and before the clamp 57 elevates to free the cigar. After the cigar has been trimmed by the knife 74 the clamp 57 elevates and then the fingers 60 eject the finished cigar.

As described above, the fingers 60 are secured upon the rod 141, and this rod is provided with a spring 159, as shown in Fig. 1, whose tension is to maintain the fingers 60 in their lower position below the cigar to be treated and to return said fingers to their lower position after each upward movement of the same in ejecting a finished cigar. The mechanism for operating the rod 141 to cause the fingers 60 to eject the cigar is probably illustrated more clearly in Figs. 1, 2, 3, and 4, and in the former figure it will be seen that upon the right-hand end of the rod 141 is secured the segment 160, said segment being in position to be engaged by the segment 161, secured upon a shaft 162 and operated from the main driving-shaft through the rod 163, arm 164, roller 165, and cam 166, the latter being on the driving-shaft 41 in position to engage said roller 165. The cam 166 by bringing its projecting portion or toe against the roller 165 will cause the arm 164 to rock downward on the fulcrum-shaft 46 and draw the rod 163 and segment 161 downward, the said segment 161 on its downward movement engaging the segment 160 on the shaft 141 and turning said shaft toward the operator, thereby causing the fingers 60 to be moved quickly upward and throw the cigar resting thereon frontward toward the operator, the cigar falling upon the plate 61. As soon as the projecting portion of the cam 166 leaves the roller 165 of the arm 164 the spring 167 on the shaft 162 (see Fig. 1) will restore the segment 161 to its former upward position, (shown in Fig. 2,) and the spring 159, Fig. 1, on the rod 141 will return the fingers 60 and the segment 160 to their normal position. The spring 167 is on the shaft 162, carrying the segment 161, and this spring retains the roller 165 of the arm 164 constantly against the cam 166. The segments 148 and 150 operate to cause the knife 74 to trim the tuck end of the cigar just prior to the operation of the segments 161 and 160 to move the fingers 60 upward for the purpose of ejecting the finished cigar. Upon the shaft 141, as shown in Fig. 2, is a stop-arm 168, which engages a pin 169 on the gear-wheel 39, this arm 168 and pin 169 being used to arrest the rod 141 at the proper time and thereby to prevent the spring 159 from unduly driving said rod 141 beyond its normal position, and likewise the rod 140, as shown in Fig. 2, is provided with a stop-arm 170 to engage the pin 171 on the gear-wheel 39, and thereby arrest said rod 140 at the proper time and prevent the spring 147 from unduly turning said rod 140.

The various parts of the machine made the subject of this application have been so thoroughly described hereinbefore as to their construction, mode of operation, and timing that it would seem unnecessary to further describe the operation of the machine in any detail.

Figs. 17 and 18 illustrate the work the machine performs. The cigar to be headed is wrapped by hand or by any of the well-known methods, the wrapper at the head end of the cigar being left free, as shown in Fig. 17, to be wound upon the cigar to complete the head thereof by the axially-revoluble motion of the cigar. The cigar is held within a suitable frame 36, which has a rapid revolving motion, while the head end of the cigar is within the cavity 55 of the thimble 56. A clamp 57 firmly holds the cigar during the revoluble motion of the holding-frame 36, and after the revoluble frame 36 has made about three and one-half revolutions and has come to a stop the coöperating cutters 73 74 trim the tuck end of the cigar, the thimble 56 recedes from the head end of the cigar, the clamp 57 elevates from the cigar, and the ejector-fingers 60 throw the cigar forward toward the operator and upon the receiving-plate 61. The fingers 60 operate together and form an ejector for discharging the finished cigar from the frame 36. The revoluble frame 36 has a more rapid motion than that of the driving-shaft 41 and makes about three and one-half revolutions during a part of one revolution of said driving-shaft, and said frame 36 comes to a stop before said driving-shaft has reached the end of its revolution in order that after said frame has come to a stop the said driving-shaft may impart the proper movements to the knife 74, clamp 57, and ejector-fingers 60 before it reaches the end of its revolution. The rear angular edge of the thimble 56 is important in that by reason thereof the wrapper overhanging said angular edge may be conveniently trimmed off on a line which will insure the proper formation of the point of the cigar. The angular edge of the thimble 56 may, if desired, be faced with steel, as illustrated in Fig. 19, in order to form a hard edge against which the trimming-blade 85 may move during the trimming of the overhanging wrapper. The thimble 56 may be made of brass. The operation of the table 132, connected with the thimble 56, has been fully described hereinbefore, and said table is of importance, particularly with some classes of wrappers, as above described.

The machine above described has been put into practical use and has demonstrated great efficiency.

While the form and construction of the various parts of the machine are regarded as important and novel, I do not limit the invention to such form and construction of the parts, nor to the various details above described, further than they may be specifically pointed out in the claims.

The form, construction, and arrangement of the various parts may be modified in many respects without departing from the invention sought to be protected hereby.

What I claim as my invention, and desire to secure by Letters Patent, is—

1. In a machine of the character described, the revoluble frame for carrying or holding a cigar, and means for holding the cigar in said frame, combined with the thimble receiving the head end of said cigar and at its outer side cut off at an angle to the longitudinal center of the cigar, the wrapper-trimming knife arranged to move along the angular side of said thimble and means for operating said knife; substantially as set forth.

2. In a machine of the character described, the revoluble frame for carrying or holding a cigar, and means for holding the cigar in said frame, combined with the thimble in line with said frame and receiving the head end of the cigar, a knife coöperating with said thimble for trimming the projecting part of the wrapper, means for operating said knife and means for moving said thimble inward toward the said revoluble frame to receive the head end of the cigar and outward therefrom to release the finished cigar; substantially as set forth.

3. In a machine of the character described, the revoluble frame to receive the cigar, means for holding the cigar in said frame and the thimble adjacent to the end of said frame to receive the head end of the cigar, combined with the knife for trimming the projecting portion of the wrapper, means for operating said knife and the paste-nozzle adjacent to said thimble for supplying paste to the exposed upper side of said wrapper adjacent to the head of the cigar; substantially as set forth.

4. In a machine of the character described, the revoluble frame for carrying or holding a cigar, means for holding the cigar in said frame, and the thimble adjacent to the end of said frame to receive the head end of the cigar and having a side opening, combined with the knife for trimming the wrapper at said thimble, means for operating said knife and the paste-nozzle adjacent to said thimble and having a widened discharge end for supplying paste to the exposed upper surface of the wrapper adjacent to the head of the cigar and in close proximity to the opening in said thimble; substantially as set forth.

5. In a machine of the character described, the revoluble frame for carrying or holding a cigar, means for holding the cigar in said frame, and the thimble adjacent to the end of said frame to receive the head end of the cigar, combined with the knife for trimming the wrapper at said thimble, means for operating said knife, the movable paste-nozzle adjacent to said thimble, means for supplying paste to said nozzle, and means for moving said nozzle downward adjacent to the thimble to supply the paste to the exposed upper surface of the wrapper; substantially as set forth.

6. In a machine of the character described, the revoluble frame for carrying or holding a cigar, means for holding the cigar in said frame, and the thimble adjacent to the end of said frame for receiving the head end of the cigar, combined with the knife for trimming the wrapper at the thimble, means for operating said knife, the pivoted paste-nozzle, means for supplying paste to said nozzle, and means intermediate said knife and nozzle whereby upon the descent of said knife to trim the wrapper said nozzle will also descend to supply paste to the exposed upper surface of the wrapper on the thimble; substantially as set forth.

7. In a machine of the character described, the revoluble frame for carrying or holding a cigar, means for holding the cigar in said frame, and the thimble adjacent to the end of said frame for receiving the head end of the cigar, combined with the pivoted knife, means for operating said knife to trim the wrapper, the pivoted paste-nozzle, means for supplying paste to said nozzle, the spring normally maintaining the discharge end of said nozzle in its upward position, and the pin extending from said nozzle over the shank end of said knife whereby the upward movement of said shank end due to the depression of the blade of the knife will turn the discharge end of said nozzle downward to deliver the paste upon the exposed upper surface of the wrapper on the thimble; substantially as set forth.

8. In a machine of the character described, the revoluble frame for carrying or holding a cigar, means for holding the cigar in said frame, and the thimble adjacent to the end of said frame for receiving the head end of the cigar, combined with the pivoted knife for trimming the wrapper, means for operating said knife, means for applying paste to the wrapper while on said thimble, and means for moving said thimble toward the end of said revoluble frame to receive the head end of the cigar and away from said revoluble frame to release the cigar; substantially as set forth.

9. In a machine of the character described, the revoluble frame for carrying or holding a cigar, means for holding the cigar in said frame, the thimble adjacent to the end of said frame to receive the head end of the cigar, and means for moving said thimble toward said frame to receive the head end of the cigar and away from said frame to release the cigar, combined with the pivoted knife for trimming the wrapper at said thimble, means for operating said knife, and the paste-nozzle adapted to discharge the paste upon the upper exposed surface of the wrapper on said thimble; substantially as set forth.

10. In a machine of the character described, the revoluble frame for carrying or holding a cigar, means for holding the cigar in said frame, and the thimble adjacent to the end of said frame to receive the head end of the cigar, combined with the knife for trimming the wrapper overhanging said thimble, means for operating the knife, and means for applying paste to the upper exposed surface of the wrapper on said thimble; substantially as set forth.

11. In a machine of the character described, the revoluble frame for receiving the cigar, the clamp carried by said frame for holding the cigar thereon, the driving-shaft, and means intermediate said clamp and the driving-shaft for operating said clamp, combined with the thimble adjacent to the end of said frame for receiving the head end of the cigar, the knife for trimming the wrapper overhanging said thimble, means intermediate said knife and the driving-shaft for operating the knife, means for applying paste to the wrapper held on said thimble, and means intermediate said frame and the driving-shaft for operating the frame from the said shaft; substantially as set forth.

12. In a machine of the character described, the revoluble frame for carrying or holding a cigar, the clamp carried by said frame for retaining the cigar in said frame, the ejector carried by the frame below the surface of the portion thereof which receives the cigar, the driving-shaft and means for operating said clamp and ejector from the driving-shaft, combined with the thimble adjacent to the end of said frame for receiving the head end of the cigar, and means for moving said thimble toward said frame to receive the head end of the cigar and away from said frame to release the finished cigar; substantially as set forth.

13. In a machine of the character described, the revoluble frame for carrying or holding a cigar, the clamp retaining the cigar in said frame, the ejector carried by said frame below the surface of the portion thereof which receives the cigar, the driving-shaft and means for operating said revoluble frame, clamp and ejector from the main driving-shaft, combined with the thimble adjacent to the end of said frame, the knife for trimming the leaf overhanging said thimble, means for operating said knife from the driving-shaft, and means also operated from the driving-shaft for applying paste to the wrapper on said thimble; substantially as set forth.

14. In a machine of the character described, the revoluble frame for holding the cigar, the clamp for retaining the cigar in said frame, the trimming-knives carried by said frame for trimming the tuck end of the cigar, one of said knives being stationary and the other movable, the driving-shaft, and means for operating the movable one of said knives from the driving-shaft, combined with the thimble adjacent to the end of said revoluble frame to receive the head end of the cigar, the knife for trimming the wrapper overhanging said thimble, and means for operating said knife from the driving-shaft; substantially as set forth.

15. In a machine of the character described, the revoluble frame for carrying or holding a cigar, the clamp for retaining the cigar in said frame, the slide carried by said frame, the stationary knife carried by said slide, the movable knife carried by said slide for coöperating with the said stationary knife to trim the tuck end of the cigar, the driving-shaft, means intermediate said movable knife and the driving-shaft for operating the former from the latter, and means for adjusting said slide in said frame in accordance with the various lengths of cigars, combined with the thimble adjacent to the end of said frame to receive the head end of the cigar, and the knife for trimming the wrapper overhanging said thimble; substantially as set forth.

16. In a machine of the character described, the revoluble frame for carrying or holding a cigar, the clamp carried by said frame for retaining the cigar therein, the ejector carried by said frame below the surface of the portion thereof which receives the cigar, the driving-shaft, means for operating said clamp and ejector from the driving-shaft, the stationary knife carried by said frame, the coöperating movable knife carried by said frame, and means intermediate said movable knife and the driving-shaft for operating the former from the latter, combined with the thimble adjacent to the end of said frame to receive the head end of the cigar, and means for moving said thimble toward said frame to receive the head end of the cigar and away from said frame to release the cigar; substantially as set forth.

17. In a machine of the character described, the revoluble frame for holding the cigar, the clamp carried by said frame for retaining the cigar therein, the ejector carried by said frame below the surface of the portion thereof which receives the cigar, the driving-shaft, means for operating said frame, clamp and ejector from the main driving-shaft, the stationary cutter carried by said frame, the movable coöperating cutter carried by said frame for trimming the tuck end of the cigar, and means for operating said movable cutter from the driving-shaft, combined with the thimble at the end of said frame to receive the head end of the cigar, the knife for trimming the wrapper overhanging said thimble, a paste-nozzle adjacent to said thimble for supplying paste to the wrapper thereon, means for operating said wrapper-trimming knife from the main driving-shaft, means for forcing the paste from said nozzle from the main driving-shaft, and means for moving said thimble toward said revoluble frame to receive the head end of the cigar and away from said frame to release the cigar; substantially as set forth.

18. In a machine of the character described, the revoluble frame for holding the cigar, the clamp carried by said frame for retaining the cigar therein, the ejector carried by said frame below the surface of the portion thereof which receives the cigar, the adjustable slide in said frame, the cutters, one being movable and the other stationary, carried by said slide for trimming the tuck end of the cigar, means for adjusting said slide, the driving-shaft and means for operating the movable one of said cutters, said revoluble frame, said clamp and said ejector from the driving-shaft, combined with the thimble adjacent to the end of said frame to receive the head end of the cigar, the pivoted knife for trimming the wrapper overhanging said thimble, means for operating said knife from the driving-shaft, the pivoted paste-nozzle adapted to discharge the paste upon the upper side of the wrapper on said thimble, means for operating said nozzle and means operated from the driving-shaft for forcing the paste through said nozzle; substantially as set forth.

19. In a machine of the character described, the revoluble frame for holding the cigar, the clamp carried by said frame, the ejector also carried by said frame, the shaft carried by said frame and upon which said ejector is mounted, the driving-shaft, means for operating said frame from the driving-shaft, and independent means intermediate the said shaft carried by the said frame and the main driving-shaft for operating said shaft and through it said ejector, combined with the thimble adjacent to the end of said frame to receive the head end of the cigar; substantially as set forth.

20. In a machine of the character described, the revoluble frame to receive the cigar, the clamp carried by said frame for holding the cigar therein, the ejector carried by said frame below the surface of the portion thereof which receives the cigar, the driving-shaft, the parallel shafts carried by said frame and upon which said clamp and ejector are respectively mounted, means for operating said frame from the driving-shaft, the slide mounted on said shafts within said frame, the cutters, one being movable and the other stationary, carried by said slide for trimming the tuck end of the cigar, and the movable one of which is mounted on one of said parallel shafts, means for adjusting said slide, and independent means for operating from the driving-shaft the two shafts carried by said frame and through them said movable cutter and ejector, combined with the thimble at the end of said frame to receive the head end of the cigar, and means for operating said clamp from the driving-shaft; substantially as set forth.

21. In a machine of the character described, the revoluble frame to receive the cigar and being cylindrical at one end, the bearing for said end of said frame, the gear-wheel upon said end of said frame, and means for holding the cigar in said frame, combined with the thimble adjacent to the end of said frame to receive the head end of the cigar, the driving-shaft, gearing intermediate the said gear-wheel and the driving-shaft of the machine whereby said revoluble frame is caused to have a more rapid revolution than said driving-shaft and to stop before said driving-shaft has reached the end of its revolution, and means for stopping said driving-shaft at the end of each of its revolutions; substantially as set forth.

22. In a machine of the character described, the revoluble frame for carrying or holding a cigar, means for holding the cigar in said frame, the thimble adjacent to the end of said frame to receive the head end of the cigar, the driving-shaft and means intermediate said revoluble frame and the driving-shaft of the machine for operating the latter from the former and imparting to said frame from said driving-shaft a more rapid revolution than that of the shaft and stopping said frame before the driving-shaft comes to a stop, and means for stopping said shaft at the end of each revolution; substantially as set forth.

23. In a machine of the character described, the revoluble frame for holding the cigar, the clamp carried by said frame for retaining the cigar therein, the ejector carried by said frame for ejecting the finished cigar, the driving-shaft and the thimble adjacent to the end of said frame for receiving the head end of the cigar, combined with means intermediate said frame and the main driving-shaft for imparting a rapid revolution to said frame and then to stop said frame before the said driving-shaft comes to a stop, means for stopping said driving-shaft at the end of its proper movement, and means intermediate said clamp and said driving-shaft for operating said clamp after said frame has come to a stop, and means intermediate said ejector and said driving-shaft for operating said ejector after said frame has come to a stop and after said clamp has been released from the cigar; substantially as set forth.

24. In a machine of the character described, the revoluble frame for holding or carrying a cigar, the clamp carried by said frame for retaining the cigar therein, the ejector carried by said frame for discharging the finished cigar therefrom, the driving-shaft and the cutter carried by said frame for trimming the tuck end of the cigar, combined with the thimble adjacent to the end of said frame for receiving the head end of the cigar, means intermediate said revoluble frame and the main driving-shaft for imparting a more rapid revoluble motion to said frame than that of said shaft and then stopping said frame before said shaft comes to a stop, means for stopping said driving-shaft at the end of its proper movement and means intermediate said clamp, ejector and cutter and said shaft for operating the same from the shaft after said frame has come to a stop and before said shaft has come to a stop; substantially as set forth.

25. In a machine of the character described, the revoluble frame for carrying or holding a cigar, the clamp carried by said frame for retaining the cigar therein, the ejector carried by said frame for discharging the finished cigar therefrom, the driving-shaft and the thimble adjacent to the end of said frame for receiving the head end of the cigar, combined with means intermediate said thimble and the driving-shaft of the machine for moving said thimble toward the frame to receive the head end of the cigar and then outward therefrom to release the finished cigar, means intermediate said driving-shaft and said revoluble frame for imparting a more rapid revolution to said frame than that of said shaft and stopping said frame before said shaft comes to a stop, means for stopping said shaft at the end of its proper movement, means intermediate said clamp and said shaft for operating said clamp from the shaft after said frame has come to a stop, and means intermediate said ejector and said shaft for operating said ejector from the shaft after the said frame has come to a stop; substantially as set forth.

26. In a machine of the character described, the revoluble frame to receive the cigar, the clamp carried by said frame to retain the cigar therein, and the knife carried by said frame for trimming the tuck end of the cigar, combined with the thimble adjacent to said frame to receive the head end of the cigar, the driving-shaft, means intermediate said frame and the driving-shaft for imparting a more rapid revolution to said frame than that of said shaft, means intermediate said knife and said shaft for operating the former from the latter to trim the tuck end of the cigar, means intermediate said clamp and said shaft for releasing said clamp from the cigar after said frame has come to a stop and before the driving-shaft has come to a stop and means for stopping said driving-shaft at the end of its movement; substantially as set forth.

27. In a machine of the character described, the revoluble frame for receiving the cigar, the clamp carried by said frame for retaining the cigar therein, the ejector carried by said frame for discharging the finished cigar therefrom, the thimble adjacent to said frame to receive the head end of the cigar, the driving-shaft and the knife for trimming the wrapper overhanging said thimble, combined with means intermediate said revoluble frame and the driving-shaft for imparting to the former a more rapid revolution than that of the shaft and stopping said frame prior to the stoppage of the shaft, means for stopping said shaft at the end of its proper movement, means intermediate said knife and shaft for operating the former from the latter, means intermediate said clamp and shaft for operating the former from the latter, and means intermediate said ejector and said shaft for operating the former from the latter after said revoluble frame has come to a stop; substantially as set forth.

28. In a machine of the character described, the revoluble frame to receive the cigar, means for holding the cigar therein, the thimble adjacent to the end of said frame to receive the head end of the cigar, the driving-shaft and the cutters carried by said frame for trimming the tuck end of the cigar, one of said cutters being movable and the other stationary, combined with means intermediate said frame and the driving-shaft for revolving the said frame from the said shaft, and means intermediate the movable one of said cutters and the driving-shaft for operating the said movable cutter from the said shaft; substantially as set forth.

29. In a machine of the character described, the revoluble frame for carrying or holding a cigar, the ejector carried by said frame for ejecting the finished cigar, the clamp carried by said frame for holding the cigar therein, the slide carried by said frame and adjustable therein, and the cutters carried by said slide for trimming the tuck end of the cigar, one of said cutters being stationary and the other movable, combined with the thimble adjacent to said frame for receiving the head end of the cigar, the knife for trimming the leaf overhanging said thimble, means for operating said knife, means for moving said thimble toward said frame to receive the head end of the cigar and then from said frame to release the cigar, the driving-shaft, means intermediate said frame and the driving-shaft for imparting a more rapid revolution to said frame than that of said shaft and then stopping said frame before said shaft comes to a stop, means for stopping said shaft at the end of its proper movement, means intermediate the movable one of said cutters and said shaft for operating the former from the latter, means intermediate said clamp and said shaft for operating the former from the latter, and means intermediate said ejector and said shaft for operating the former from the latter and after said frame has come to a stop; substantially as set forth.

30. In a machine of the character described, the revoluble frame for holding the cigar, the clamp carried by said frame for holding the cigar therein, the ejector carried by said frame for ejecting the finished cigar therefrom, the parallel shafts in said frame, the slide mounted on said shafts, means for adjusting said slide on said shafts, the stationary cutter carried by said slide, and the movable cutter carried by said slide and keyed to one of said shafts, the other of said shafts being connected to said ejector, combined with the thimble adjacent to the said frame to receive the head end of the cigar, the driving-shaft, means intermediate said revoluble frame and the driving-shaft for imparting a more rapid revolution to said frame than that of said shaft and stopping said frame prior to the stoppage of said shaft, means for stopping said shaft at the end of its proper movement, independent means intermediate said parallel shafts and said driving-shaft for operating the former from the latter, and means intermediate said clamp and the driving-shaft for operating the former from the latter; substantially as set forth.

31. In a machine of the character described, the revoluble frame for carrying or holding a cigar, a clamp for holding the cigar in said frame, and the thimble adjacent to the end of said frame to receive the head end of the cigar, the said thimble having its outer side at an angle to the longitudinal center of the cigar-clamp, combined with the knife for trimming the wrapper overhanging the outer angular edge of said thimble, the driving-shaft, means for operating said knife from the driving-shaft, means for operating said revoluble frame from the driving-shaft, means for applying paste to the wrapper on said thimble and means for operating the paste mechanism from the driving-shaft; substantially as set forth.

32. In a machine of the character described, the revoluble frame for carrying or holding a cigar, a clamp for holding the cigar in said frame, the driving-shaft, means for revolving said frame from the driving-shaft, and the thimble adjacent to the end of said frame to receive the head end of the cigar, the outer side of said thimble being at an angle to the longitudinal center of the cigar-clamp, combined with the knife for trimming the wrapper overhanging the outer angular edge of said thimble, means for operating said knife from the main driving-shaft, a nozzle for applying paste to the upper exposed surface of the wrapper on said thimble, a paste-reservoir, a flexible tube connecting said nozzle and said reservoir, and means intermediate said reservoir and the driving-shaft for forcing the paste therefrom through said flexible tube and said nozzle to the wrapper on said thimble; substantially as set forth.

33. In a machine of the character described, the revoluble frame for carrying or holding a cigar, means for holding the cigar in said frame, the driving-shaft, means for revolving said frame from the main driving-shaft and the thimble adjacent to the end of said frame to receive the head end of the cigar, combined with the knife for trimming the wrapper overhanging the edge of said thimble, means for operating said knife from the main driving-shaft, means for moving said thimble toward said frame to receive the head end of the cigar and then from said frame to release the finished cigar, the pivoted paste-nozzle adjacent to said thimble, means for moving the discharge end of said nozzle downward to deliver the paste upon the wrapper on the thimble and then upward therefrom, the paste-reservoir, the flexible tube connecting said nozzle and said reservoir, and means intermediate said reservoir and the main driving-shaft for forcing the paste from said reservoir through said flexible tube and nozzle to the wrapper on said thimble; substantially as set forth.

34. In a machine of the character described, the revoluble frame for carrying or holding a cigar, means for holding the cigar in said frame, the driving-shaft, means for revolving said frame from the driving-shaft, the thimble adjacent to the end of said frame to receive the head end of the cigar, the knife for trimming the wrapper overhanging the edge of said thimble, and means for operating the said knife from the driving-shaft, combined with a paste-nozzle to direct the paste to the wrapper on said thimble, the reservoir connected with said nozzle for supplying paste to the same, the piston in said reservoir and acting against the body of paste therein, the threaded stem carried by said piston, the threaded sleeve engaging said threaded stem, the ratchet on said stem and loosely keyed thereto, and means for imparting to said ratchet an intermittent motion from the driving-shaft of the machine, whereby said ratchet is caused to turn said threaded stem and said threaded sleeve is enabled to move said threaded stem and its piston against the paste in said reservoir; substantially as set forth.

35. In a machine of the character described, the revoluble frame for carrying or holding a cigar, and means for holding the cigar in said frame, combined with the thimble receiving the head end of the cigar, the table on said thimble to receive the projecting portion of the wrapper, said table being inclined downward from a point above the longitudinal center of the point of the cigar and means for moving said thimble and table toward said frame to receive the head end of the cigar and said portion of the wrapper and then away from said frame to release the finished cigar; substantially as set forth.

36. In a machine of the character described, the revoluble frame for carrying or holding a cigar, and means for holding the cigar in said frame, combined with the thimble receiving the head end of the cigar, the table on said thimble to receive the loose portion of the wrapper, means for locking said table in its lower position to facilitate the introduction of the head of the cigar to the cavity in said thimble, means for freeing said table after the cigar is in position, and means for elevating the outer end of said table in order that said table may elevate the projecting portion of the wrapper on a line extending downward from the outer end of said thimble; substantially as set forth.

37. In a machine of the character described, the revoluble frame for holding a cigar, and means for holding the cigar in said frame, combined with the thimble receiving the head end of the cigar, the table on said thimble to receive the projecting portion of the wrapper, a spring imparting a normal upward tension to the outer end of said table, the catch for holding the outer end of said table in its lower position, the trimming-knife for cutting off the wrapper overhanging the edge of said thimble and adapted to engage said catch and free the same from said table in order that the latter may spring upward, and means for operating said knife; substantially as set forth.

38. In a machine of the character described, the revoluble frame for carrying or holding a cigar, means for holding the cigar in said frame, and the thimble receiving the head end of the cigar, combined with the table on said thimble to receive the projecting portion of the wrapper, the catch for holding said table in its lower position to facilitate the introduction of the head of the cigar to said thimble, the spring imparting an upward tension to the outer end of said table, means for moving said thimble toward said frame to receive the end of the cigar and away from said frame to release the end of the cigar, means for engaging the outer end of said table with said catch when said thimble has moved outward from said revoluble frame, and means for freeing said table from said catch in order that its outer end may spring upward when said thimble is at its inward position adjacent to said revoluble frame and has received the head end of the cigar; substantially as set forth.

In testimony whereof I affix my signature in presence of two witnesses.

JOHN R. WILLIAMS.

Witnesses:
   CHAS. C. GILL,
   E. JOS. BELKNAP.